United States Patent [19]

Lyman

[11] 4,043,614

[45] Aug. 23, 1977

[54] MAGNETIC SUSPENSION APPARATUS

[75] Inventor: Frank Lyman, Cambridge, Mass.

[73] Assignee: Cambridge Thermionic Corporation, Cambridge, Mass.

[21] Appl. No.: 626,527

[22] Filed: Oct. 28, 1975

[51] Int. Cl.² ............................................. F16C 39/00
[52] U.S. Cl. ......................................... 308/10; 74/5.8
[58] Field of Search ................... 308/10; 74/5.8, 5.9; 73/472, 473, 517, 517 A, 518, 519

[56] References Cited

U.S. PATENT DOCUMENTS

| | | | |
|---|---|---|---|
| 2,916,279 | 12/1959 | Stanton | 308/10 |
| 3,209,152 | 9/1965 | Brouwer | 308/10 |
| 3,747,998 | 7/1973 | Klein | 308/10 |
| 3,811,740 | 5/1974 | Sacerdoti | 308/10 |

Primary Examiner—R. Skudy

Attorney, Agent, or Firm—Thomas M. Ferrill, Jr.

[57] ABSTRACT

A magnetic suspension system for efficiently supporting a rotor of relatively large radius and high available moment of inertia includes concentric stator and rotor elements spaced apart by narrow gaps of relatively large diameter and very small axial extent. A pair of spaced discs in the stator are oppositely polarized by a permanent magnet, their peripheral magnetic field strength being selectively augmented or diminished in predetermined sectors by electromagnet windings thereon. The rotor includes narrow ring faces juxtaposed to said discs, a permanent magnetic polarization being provided between the narrow ring faces. Means are provided for varying the relative electromagnetic contributions in the different sectors to maintain stability of rotor positioning with minimized electric power.

12 Claims, 9 Drawing Figures

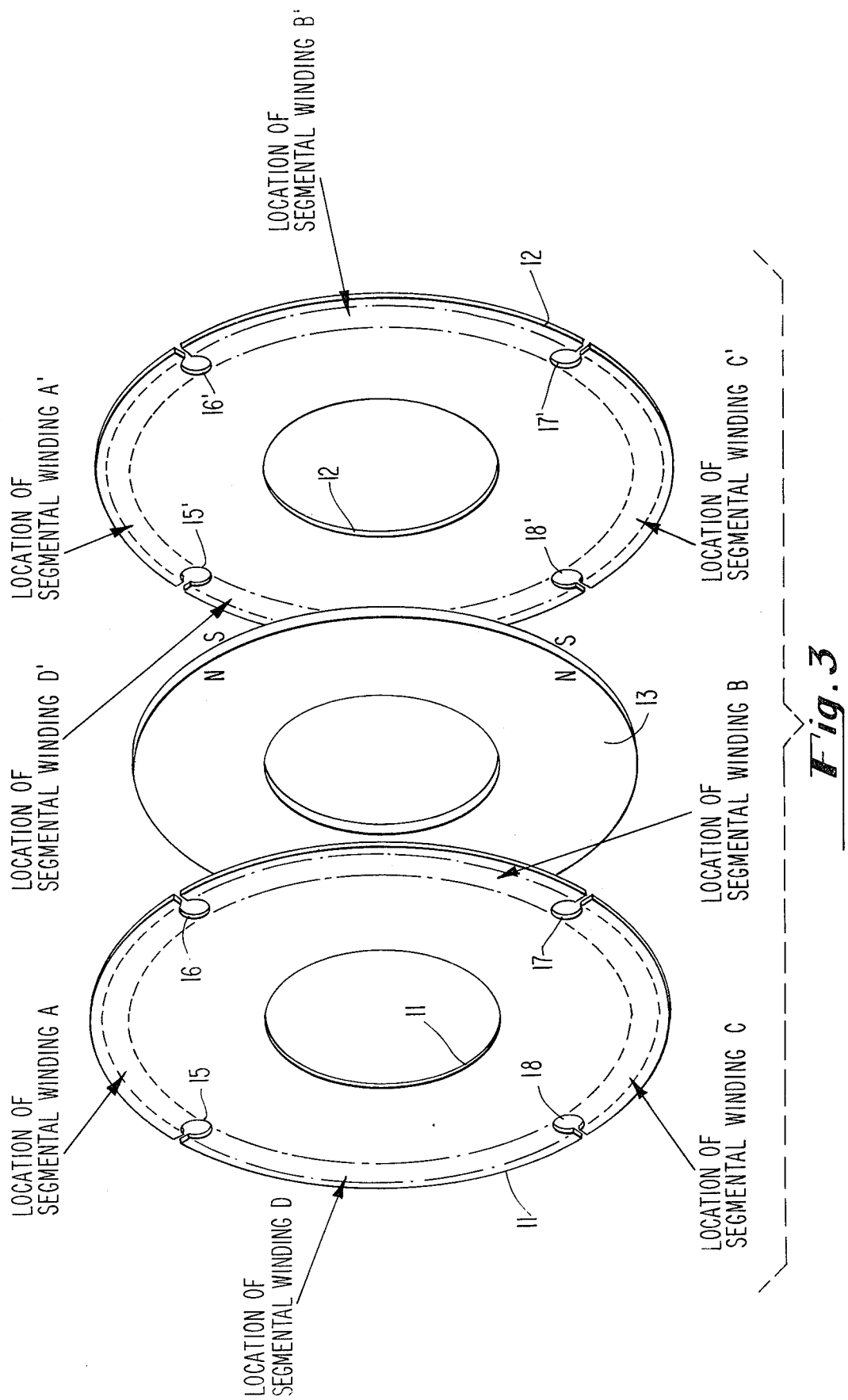

MAGNETIC SUSPENSION APPARATUS

The present invention relates to magnetic suspension systems.

Magnetic suspension systems have been described in various prior patents including, inter alia, the following U.S. patents to Joseph Lyman, assigned to the assignee of the present invention:

| Patent No. | Issued |
| --- | --- |
| 3,428,371 | February 18, 1969 |
| 3,473,852 | October 21, 1969 |
| 3,860,300 | January 14, 1975 |

The present invention is directed to improved magnetic suspension systems for affording advantages as to manufacturing along with enhanced control of the suspended body. A plurality of like bearing elements may be constructed for inclusion in one end product for stable reference purposes or other purposes having stringent requirements as to the bearings. Furthermore, high bearing efficiency and control of alignment are to be provided without excessive mass of the suspension means.

An object of this invention is to provide an improved magnetic suspension system providing great restoring force in response to the axial component of relative displacement between a stator portion and a rotor portion, providing great restoring force in response to any relative cocking (i.e. departure from parallelism) between a stator portion and a rotor portion, and providing efficient and effective control of the force components perpendicular to the axis of the stator portion to provide the optimum positioning of the rotor axis relative to the stator axis to meet the various conditions which may be encountered.

A further object of this invention is to provide an improved magnetic suspension system which provides the aforementioned benefits without excessive drag from eddy currents induced in the rotor.

Yet a further object is to provide an improved magnetic suspension system consisting of plural component wafers each having the aformentioned attributes.

In order to meet these objects, there are provided in the present invention water-like bearing units each of relatively large diameter in contrast to its thickness, wherein the magnetic gaps at which the suspension forces are generated are formed at radii approaching the overall maximum radius of a wafer unit. In a preferred version, the rotor portion is arranged not within but rather surrounding the stator portion of the bearing wafer unit. In at least one of the two portions of one wafer unit (the stator portion or the rotor portion) an axially polarized annular magnet is provided between two pole pieces which provide parallel narrow ring-like poles to coact with a pair of narrow ring-like poles of the cooperating portion (the rotor portion or the stator portion) of the wafer. In the preferred construction an axially polarized permanent magnet is included in each of the two portions (the stator and the rotor) of the wafer, the axial sensing of the rotor magnet being opposite to that of the stator magnet. The result in any event is magnetic flux directed substantially radially outward at the annular gap at one side of the wafer unit and magnetic flux directed substantially radially inward at the annular gap at the opposite side of the wafer unit.

The above-mentioned objects and features will be made more clearly apparent from the following description of a few embodiments of the invention.

In the drawings, FIG. 1 is an elevation (part broken away), and FIG. 2 is another view, partly in section, of a single stator-and-rotor wafer of a magnetic bearing system for use for example in a gyroscope or other inertial reference instrument;

FIG. 3 is an exploded view of stator discs and permanent magnet for one wafer unit;

Figures 1, 2:
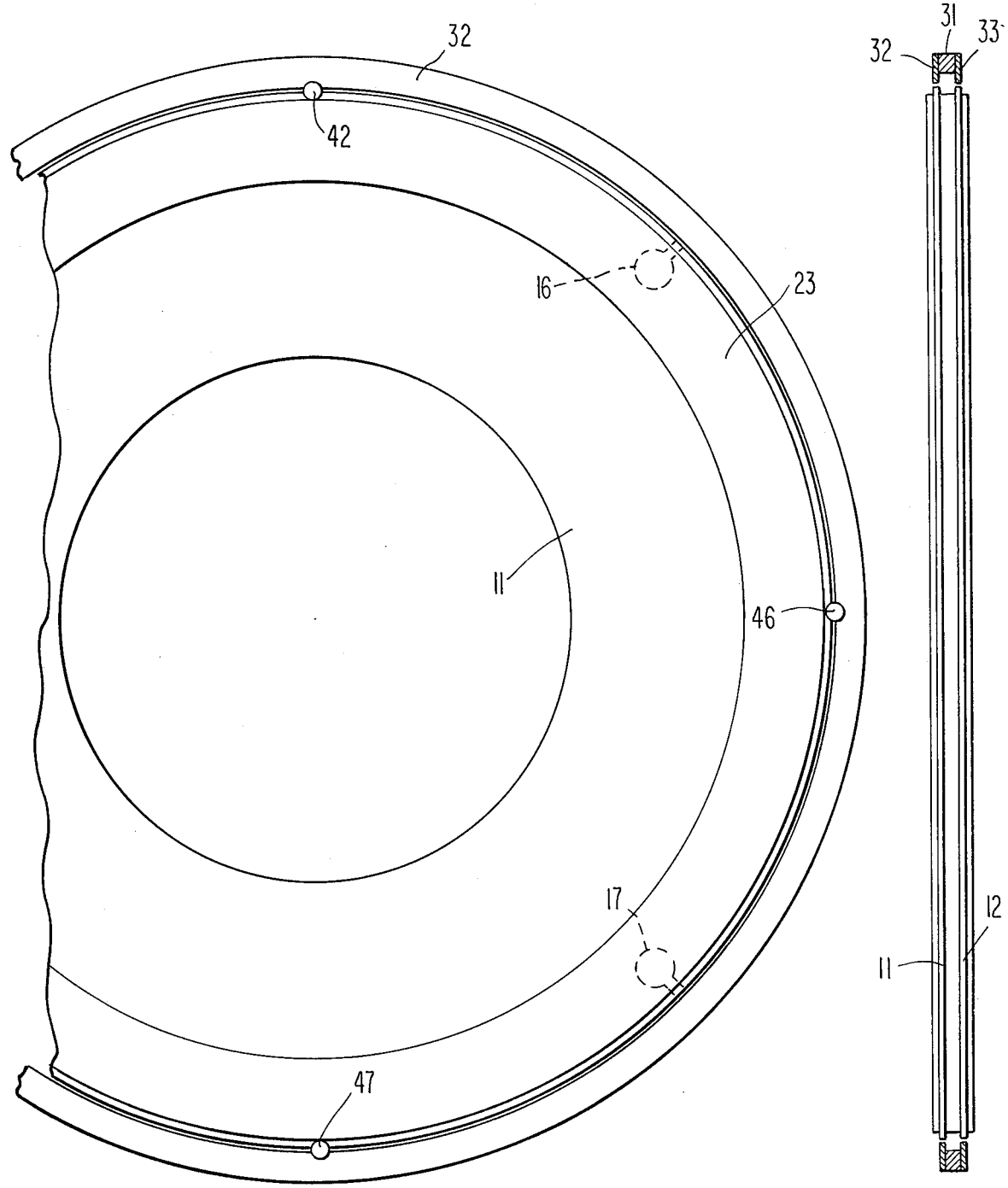
Figure 3A:
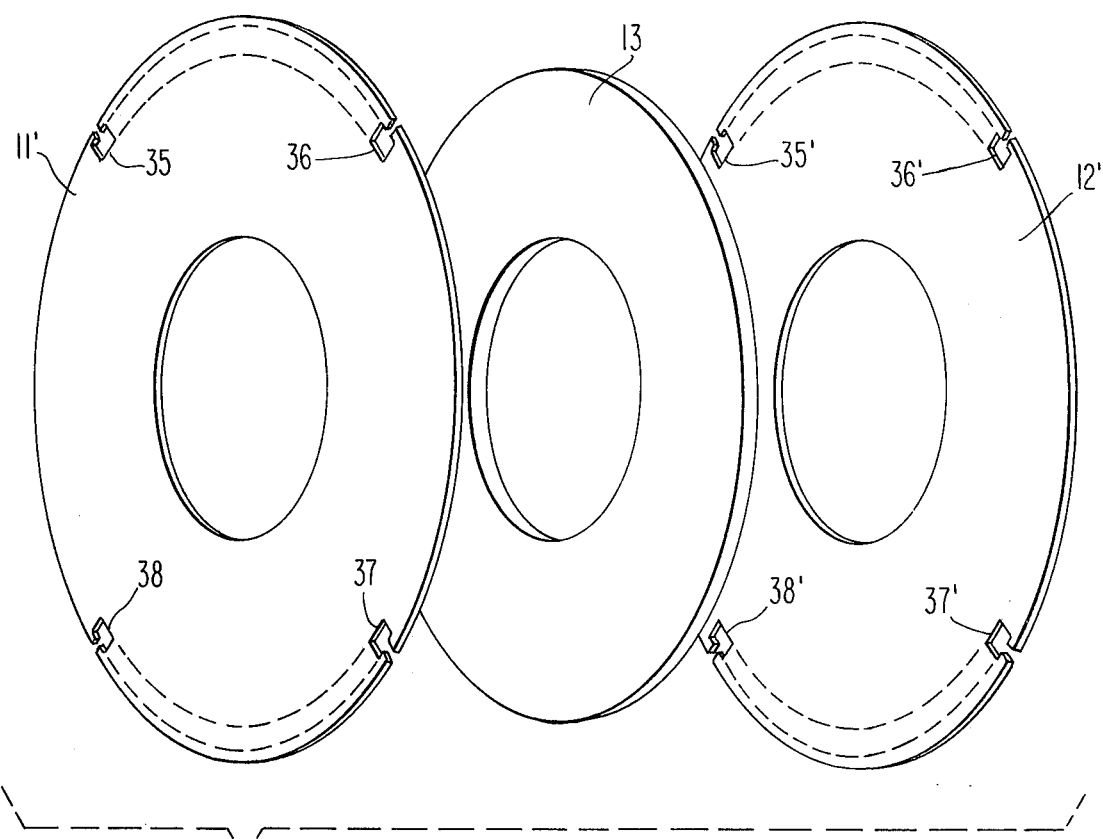
FIG. 3A is an alternative version of FIG. 3 with modified winding slots.

Referring now to FIGS. 1, 2 and 3, a single wafer of the magnetic bearing system of the present invention is shown in FIGS. 1 and 2 and certain parts thereof are diagramatically shown in FIG. 3. This wafer is made up primarily of a pair of oppositely disposed permeable pole pieces (i.e. pole discs) 11 and 12 between which is sandwiched an axially polarized permanent magnet 13 (FIG. 3). As shown in FIGS. 3 and 3A, the permanent magnet 13 may be of the general shape of a thick washer, and may be made of a material such as one of the alnico alloys, or preferably of samarium cobalt. The disc-like pole pieces 11 and 12 are of larger outer diameter than the magnet 13 which is sandwiched therebetween, the pole pieces 11 and 12 being arranged to extend radially beyond the magnet 13 and provide room for segmental windings in their peripheral regions.

Referring to FIG. 3, winding slots 15, 16, 17 and 18 are provided at 90° intervals around the periphery of pole piece 11, and corresponding slots 15', 16', 17' and 18' are provided around the periphery of pole piece 12.

In FIG. 3 the locations of four segmental windings for pole piece 11 are indicated. The locations for one pair of opposite windings A and C are indicated at the top and bottom as seen in FIG. 3, and the locations for the other pair of opposite windings B and D are shown at the right and left. In like manner, pole piece 12 is arranged to receive segmental windings at A' and C' and a further pair of opposite segmental windings at B' and D'.

Figure 4:
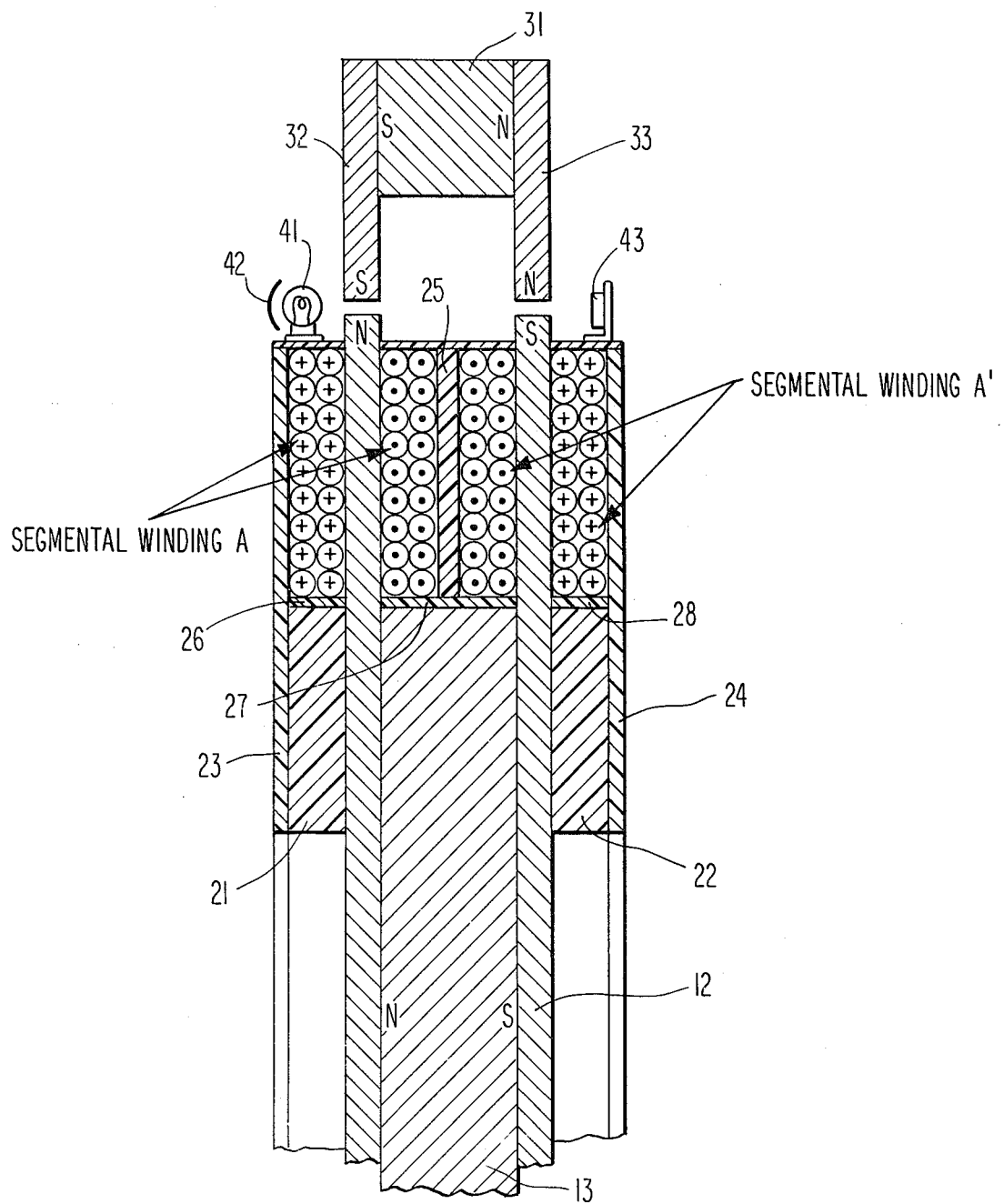
FIG. 4 is an enlarged partial cross-section taken in the vicinity of the electromagnet windings of FIG. 2.

Upon the assembling of the pole pieces 11 and 12 and the axially polarized permanent magnet 13 therebetween, the segmental windings may be applied to the pole pieces as indicated in cross-section in FIG. 4. In that partial cross-sectional view taken in the top segment of the elevation view as shown in FIG. 1, the disc-shaped pole pieces 11 and 12 are shown with the permanent magnet 13 sandwiched between. Insulating rings 21 and 22 are fixed to the outer faces of pole pieces 11 and 12 respectively, positioned co-axially with the permanent magnet 13, and providing a base for the outer portion of windings A and A', respectively. Further insulating board pieces 23, 24, and 25 and cylindrical pieces 26, 27 and 28 are provided to hold the windings A and A' (and the corresponding windings in the other segments of the sandwich) fixed in their intended positions.

The slots 15, 16, 17 and 18 and corresponding slots 15', 16', 17' and 18' in the pole discs 11 and 12 may be of any desired form, such as rectangular form or circular form. Segmental windings A and A' appearing in FIG. 4 may be connected in series, the sensing being as indicated by the dot and + signs as seen in this Figure. Each of these windings induces in its respective quadrantal segment of the stator a magnetizing force which, dependent upon the direction of the direct current flow therethrough, either augments or opposes the radially-directed magnetic flux indicated in the peripheral portions of the pole pieces 11 and 12 by the permanent magnet 13.

Also shown in FIGS. 1, 2 and 4 is the rotor portion associated with the wafer stator portion consisting of discs 11 and 12. The rotor has a substantially U-shaped cross-section, which preferably is made up in sandwich fashion by the use of an axially-polarized permanent magnet 31 in the form of a ring positioned between opposite thin pole pieces 32 and 33.

If the stator's permanent magnet 13 has its north pole at the left face and its south pole at the right face as it appears in FIGS. 3 and 3(a) and in FIG. 4, then the permanent magnet 31 should have the opposite polarization, i.e., with the south pole at the left and the north pole at the right as it appears in FIGS. 3 and 4. With this polarization, north and south poles confront each other across each of the two very narrow gaps, providing an attractive force tending to pull any portion of the rotor element toward the axis of the stator.

The pole discs 11 and 12 of FIGS. 1 and 3 are shown as having substantially circular slots at 90° intervals for the segmental magnet windings. If preferred, the slots for this purpose may be milled or punched to substantially rectangular form to receive the windings, as shown in FIG. 3A at 35, 36, 37 and 38 in disc 11' and at 35', 36', 37' and 38' in disc 12'. In either case, the gap in the periphery of the pole disc should be very narrow in order to minimize the change of flux to be encountered by any incremental portion of the rotor as its passes by the winding gap, and thus to minimize resulting eddy currents induced in the rotor.

Sensor (transducer) means and an electric control system including amplifying stages are provided for regulating the relative strength of the magnetic field contributions induced by the segmental windings in the quadrantal portions of the pole discs upon which they are situated. Referring for example to FIGS. 1 and 4, upon a displacement of the rotor in the upward direction from concentricity with the stator assembly, it becomes necessary to augment the strength of the peripheral magnetic poles in the top segment location or to weaken the strength of the peripheral magnetic poles in the opposite segment, or both. This is accomplished by passing such currents through segmental windings A and A' as to tend to strengthen the north polarized field at the top peripheral region of disc 11 and increase the south polarized field strength in the peripheral region at the top of disc 12, thereby increasing the attractive forces between these north and south pole edge regions and the confronting south and north pole portions of the rotor element, in order that the effect to be contributed is the strengthening of the attractive forces in the upper region of the stator. The weakening of the attractive forces in the opposite segment of the stator is accomplished by energizing segmental windings C and C' in the sense tending to polarize the lower peripheral region of disc 11 with a south pole and to polarize the lower region of disc 12 with a north pole, the net effect being to diminish the attractive forces exerted between the lower quadrantal segments of discs 11 and 12 and the adjacent portions of the rotor element. As previously explained, both energizations of the lower and upper segmental windings may be used simultaneously so that both contribute toward overcoming an undesired movement of the rotor portion in the translatory sense.

As is well known, various forms of position sensors may be used for initiating the signals for control of the amplifying means which in turn control the energization of the segmental winding portions. FIG. 4 illustrates, as one transducer example, the use of a lamp 41 with reflector 42 and a photocell 43 arranged to generate a greater electrical output when the spacing between the stator and rotor increases in the region of this sensor (transducer) means and to generate a reduced output signal when the spacing decreases in this region. A set of four such sensors is provided, the reflector of second and third sensors appearing at 46 and 47 in FIG. 1.

Figure 5:
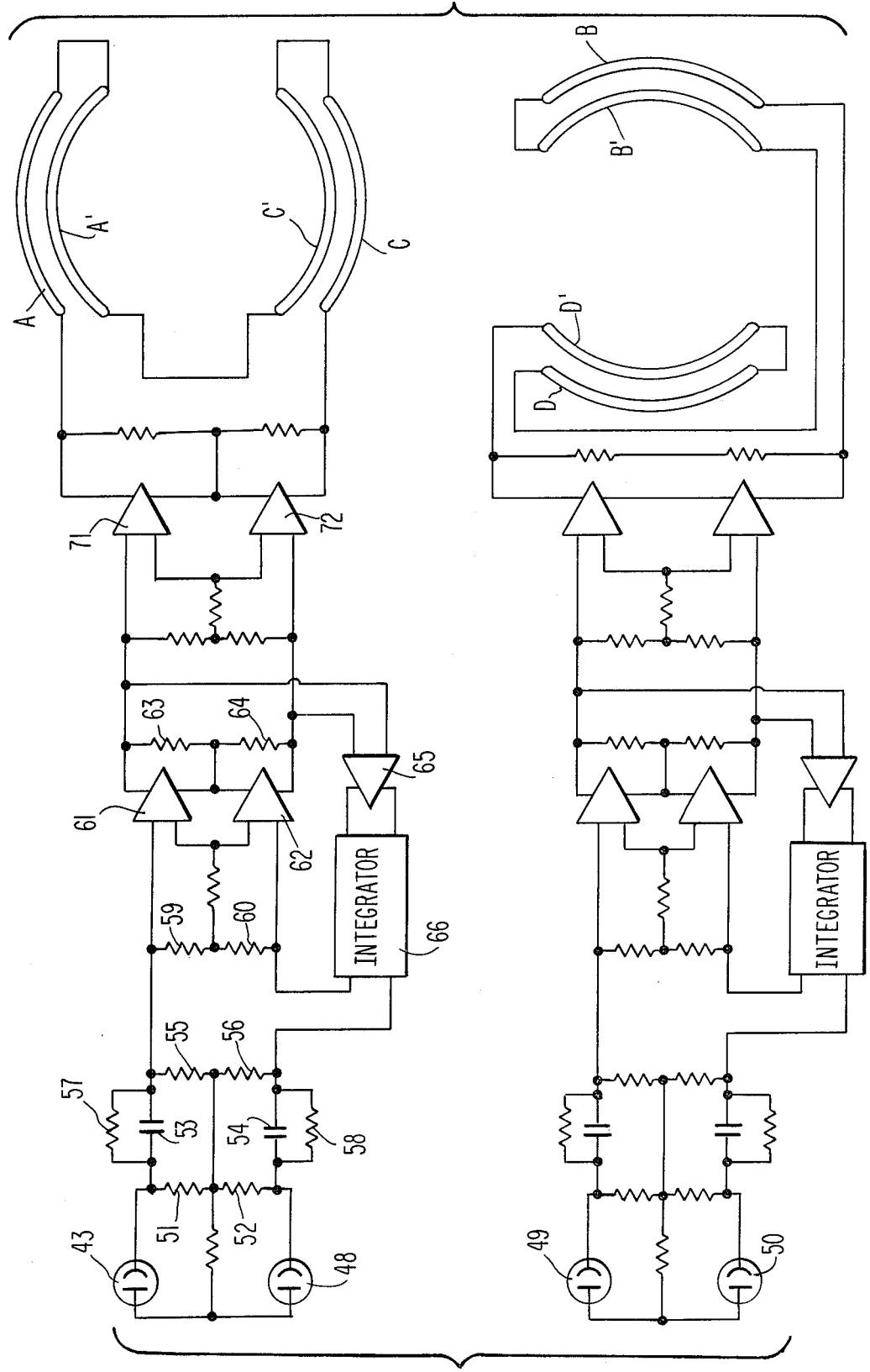
FIG. 5 is a circuit diagram of the control circuits for a single wafer unit.

A circuit arrangement for controlling the energization of the mutually opposed sectors of the wafer of FIGS. 1, 2, 3, and 4 is illustrated in FIG. 5. The photocell 43 of FIG. 4 is schematically represented at the top left in FIG. 4 at 43, and the photocell situated directly behind reflector 47 and its associated lamp is indicated at 48. The further photocell symbols 49 and 50 respectively represent the photocell associated with reflector 46 in FIG. 1 and the photocell situated diametrically opposite thereto in the portion of the wafer which is broken away in FIG. 1.

Photocells 43 and 48 provide output voltages which vary oppositely as the rotor portion 31, 32, 33 moves upward or downward relative to its position of concentricity with the stator of the wafer unit. Thus, as the rotor moves upward, the light impinging on photocell 43 increases while the light impinging on photocell 48 decreases, the output voltages produced across resistors 51 and 52 being differentially changed (i.e., made more unequal in magnitude) as the displacement increases.

Series capacitor elements 53 and 54 and load resistors 55 and 56 are provided along with capacitor shunting resistors 57 and 58. The signal voltages produced across resistors 55 and 56 are thereby caused to have both displacement components produced by resistor voltage divider action and enhanced rate-of-movement components produced by the capacitors 53 and 54 (which respectively are shunted by resistors 57 and 58). Consequently, there are produced at the inputs of amplifiers 61 and 62 input signal levels which are balanced when the rotor is concentrically positioned, and which become progressively more unbalanced as the rotor moves upward or downward from the position of symmetry as seen in FIG. 1. The output of the differential opposed amplifiers 61 and 62, produced across output load resistors 63 and 64, is coupled to the input circuit integrator amplifier 65, the output of which drives an integrator unit 66. The integrator unit 66 may take the form of an integrating feedback amplifier, or a small motor unit having a geared-down drive to a potentiometer output, or yet other of the various known forms of integrator so arranged as to provide a signal which gradually increases in one direction during a sustained preponderance of the output of photocell 43 over the output of photocell 48, and gradually increases in the opposite direction with a sustained predominance of output from photocell 48 over that of photocell 43.

As explained in U.S. Pat. No. 3,860,300 issued Jan. 14, 1975 to Joseph Lyman and assigned to the assignee of the present application, by virtue of the insertion of the intergrator output component in addition to the net output signal produced across resistors 55 and 56 and representative of the displacement and rate of change of displacement, the suspension system is enabled to reposition the rotor element from a normally concentric position with the stator to a position so displaced as to have the unbalance of forces contributed by the permanent magnet unit offset or balance out a persisting accelerating force such as the force of the earth's gravitational field. For example, if the wafer system of FIGS. 1 and 2 is used in the vicinity of the earth and is normally arranged with the axis of rotation extending horizontally, and with the sensor which includes the reflector 42 located at the top of the unit, the gravitational pull of the earth will tend to cause the rotor 31, 32, 33, to be downwardly displaced from the position of concentricity with the stator. In the absence of the contribution from integrator 66, this would call upon the system consisting of amplifiers 61, 62 and 71, 72 to provide energizing current through the upper coils A, A' and the lower coils C, C' in the direction to diminish the field strength in the upper sector of the stator and to augment the field strength in the lower sector thereof. Such electrical energization would have to be sustained at an equilibrium condition depending upon the gains of the amplifiers and the output strengths of the photocells 43 and 48, the diminished energization of photocell 43 and the increased energization of photocell 48 causing the output of the latter to predominate by an amount just sufficient to cause the augmentation of field strength in the lower sector and the diminution of field strength in the upper sector, considered together, to counter-balance the force of gravity acting upon the rotor 31, 32, 33. Considerable electrical power would be required because the electromagnetic components produced by coils A, A' and C, C' would not only have to overcome the persisting force (in the example, the force of gravity), but also the narrowed gap in the vicinity of the top of the unit and the increased gap at the bottom would adversely unbalance the contributions of the permanent magnets.

When the amplifier 65 and the integrator 66 are connected in the circuit, the intergrator 66 provides a gradually increasing output in the series-aiding sense to augment the net output persisting across resistors 55 and 56. Hence, when a net output in a given sense persists across resistors 55 and 56, that net output will gradually be added to by a further series-aiding output coming from the integrator 66, the magnitude of the latter being proportional to the intergral of the time durng which the output in the given sense has persisted across resistors 55 and 56. Consequently, amplifiers 71 and 72 provide yet further strengthened activation of the coils A, A' and C, C' in the sense to bring the rotor back toward concentricity with the stator and to continue and carry it beyond that position, into a position at which it is displaced in the opposite direction from the concentric position by an amount sufficient to cause the net unbalanced contributions of the permanent magnets and the field strength induced thereby at the periphery of the stator to compensate for the persisting acceleration force (such as the downwardly directed force of gravity). When that condition is reached, the net output across resistors 55 and 56 representing the vertical displacement component with respect to the rotor is equal and opposite to the output of the integrator 66, the differential energizations of amplifiers 61 and 62 having thus been reduced virtually to zero, and the differential energization likewise of the power amplifiers 71 and 72 having been reduced virtually to zero.

The control system responsive to photocells 49 and 50 and arranged to control differentially the energization of coils D, D' and coils B, B' is arranged similarly to the circuit arrangement aforedescribed for the control of coils A, A' and coils C, C'. The circuit arrangements shown on FIG. 5 suffice for the control of the single wafer structure such as that shown in FIGS. 1 and 2.

By virtue of the suspension gap between the stator and the rotor being at the great diameter apparent in FIGS. 1 and 2, the positional stabilizing strength and stability of the magnetic suspension for the wafer is maximized. Furthermore, by virtue of the thin pole pieces 11 and 12 in the stator presenting very narrow peripheral ring surfaces juxtaposed to very narrow ring surfaces of the rotor pole pieces, any tendency of the rotor to become displaced axially relative to the stator is strongly opposed by the resultant distortion of the magnetic field. Thus, rigidity against displacement in an axial direction is afforded by the bearing system along with the stability with respect to displacement in the directions which are mutually perpendicular and perpendicular to the axis of the stator.

The wafer construction here illustrated and described is relatively free from major eddy current drag, and hence is capable of relatively high speed rotation. Eddy current drag is minimized when the magnetic field strength at any point around the periphery of the stator and rotor (the field strength across the gap therebetween) is substantially equal to the field strength in any other location around the periphery. This condition is most closely approached when the stator and rotor are coaxial and are substantially free from any persisting contribution from the electromagnet control circuit.

Some increase of eddy current drag occurs when the coils in different sectors of the stator are differentially energized. However, no such differential energizing is required to overcome any tendency toward displacement in the axial direction, and with respect to displacement along one or both of the two mutually perpendicular axes which are perpendicular to the axis of symmetry of the stator, the integrating circuit contribution in the control apparatus minimizes the long-sustained differential energization by the electromagnet windings. A condition of some eccentricity of the rotor relative to the stator, caused to persist in order to achieve the virtual zero power suspension condition in the presence of a sustained accelerating force (such as gravity), does cause a given area of the rotor to pass through varying magnetic field strengths and thereby have some eddy currents induced therein. However, since the mutually confronting ring faces of the stator and the rotor are very narrow, this geometry tends to minimize the resultant eddy current drag.

The eddy current drag resulting from a persisting displacement of the rotor in a given direction from concentricity with the stator is minimized by the very gradual change of magnetic field strength relative to the angular progression through a single revolution. The magnetic field strength is greatest at the point of closest proximity of stator and rotor, and it is at the lowest strength at the diametrically opposite point. Between these extremes, the change is smooth and very gradual, no abrupt steps in magnetic field intensity occuring at any point. This fact, along with the thinness of the pole pieces, prevents excessive eddy current drag.

Figure 6:
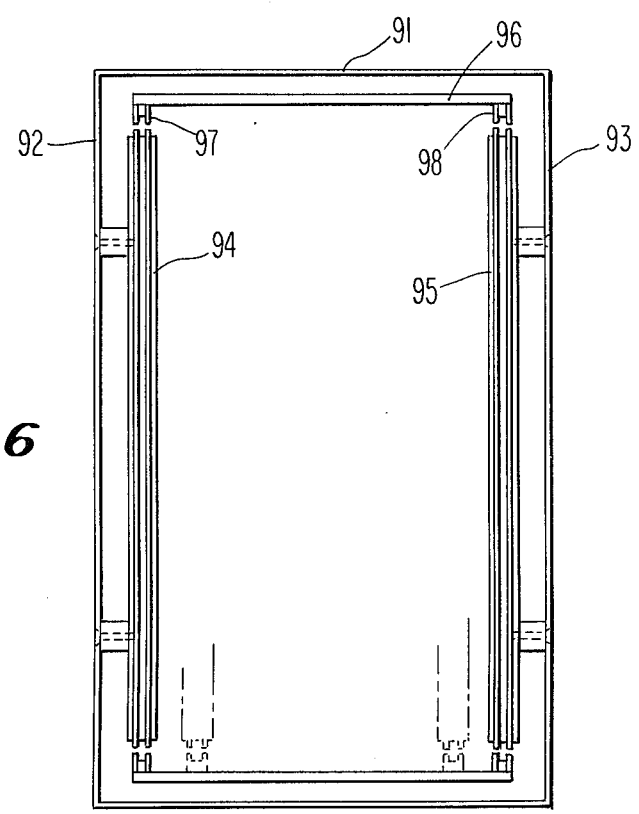
FIG. 6 is a drawing of a stator-and-rotor assembly.

FIG. 6 illustrates one of the ways in which use may be made of multiples of the wafer of FIGS. 1, 2, 3 and 4, each wafer being provided with its control circuits in accordance with FIG. 5. Referring to FIG. 6, a cylindrical rotor case or housing 91 may be provided having opposite disc ends 92 and 93 between which are suspended the stators of at least 2 wafer units, one such stator being shown at 94 and the opposite stator unit being shown at 95. The arrangement in FIG. 6 includes a rotor cyclinder 96.

As is apparent in FIG. 6, there is ample room to provide more than two magnetic suspension wafers in the apparatus contained withing the housing 91. The positions for inserting two more such wafers are indicated in dotted lines near the bottom of FIG. 6.

Where the composite rotor assembly 96, 97, 98 is to be used for the purpose of a gyroscope rotor, for example, it would be necessary to provide a motive system to supply the necessary torque for maintaining the rotor 96, 97, 98 in rotation at a suitable angular velocity. For this purpose, assuming the cylindrical body 96 of the rotor is made of brass or like conductive material, a polyphase motor stator may be arranged adjacent the cylinder 96, either within the volume enclosed by the cylinder or in the space between the cylinder 96 and the housing.

It will also be appreciated that integrated circuits may be used in the amplifying and control system such as that of FIG. 5 for each of the wafers in a structure such as the structure shown in FIG. 6, the compactness of the integrated circuits making it possible to include said circuits within the enclosure of the housing and thereby minimize the number of connections required to introduce electrical power into the rotor assembly as enclosed by the housing 91, 92, 93.

Figure 7:
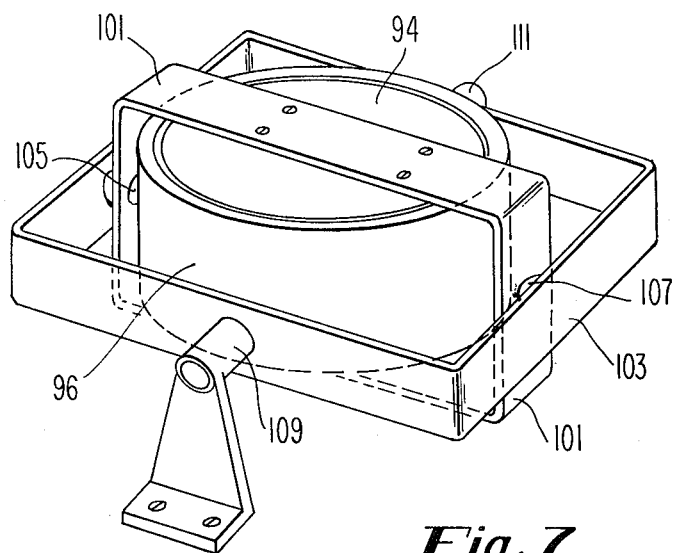
FIG. 7 is an illustrative arrangement of a gyrovertical using the wafers and control arrangement of the present invention.

One of the various uses to which a gyroscope rotor assembly may be put is the "gyrovertical" application, as illustrated in FIG. 7, For clear visualization, the rotor including cylindrical portion 96 and one end of the stator assembly are shown in FIG. 7 without an enclosing case. The stator structure is shown suspended from a stator mount ring 101 which provides some of the same functions as the case 91, 92, 93 of FIG. 6, but does not enclose and protect the rotor and stator assemblies. This stator mount ring 101 is supported by trunnions 105 and 107 in a gimbal ring 103. In turn, the gimbal ring 103 is supported by further trunnions 109 and 111 which provide freedom for its rotation about an axis perpendicular to the axis of trunnions 105, 107.

If the driving means (such as a polyphase stator for inducing currents in the rotor cylinder 96) and the control circuits are self-contained within the stator assembly, the electric control circuits and motive power for the gyroscope can be provided through brushes at the trunnions 105, 107, 109 and 111.

A navigation reference gyroscope such as a gyrovertical using the magnetic suspension elements of the present invention may if desired be arranged for servo drive of the gimbaling elements in the Cardan suspension to cause them to maintain alignment with the rotor, with minimum reaction on the rotor. In the absence of servo type follow-up, however, the momentum of the rotor and the constraints provided in each wafer tending to maintain alignment between the stator and rotor portions thereof will cause the gimbal system to follow up the stable orientation of the rotor axis, resulting from its own substantial momentum.

The application of the invention to use in a gyroscope, and the more specific application to use in a gyrovertical instrument, are merely illustrative and are not by any means the only uses for which the present invention is advantageous. It affords its significant advantages for suspension of nonrotating inertial bodies, for suspension of motor elements, and for various uses for which bearings are required. It affords especially important advantages where lubricants which would be required for ball bearings tend to escape and cause eventual destruction of the ball bearings.

Figure 8:
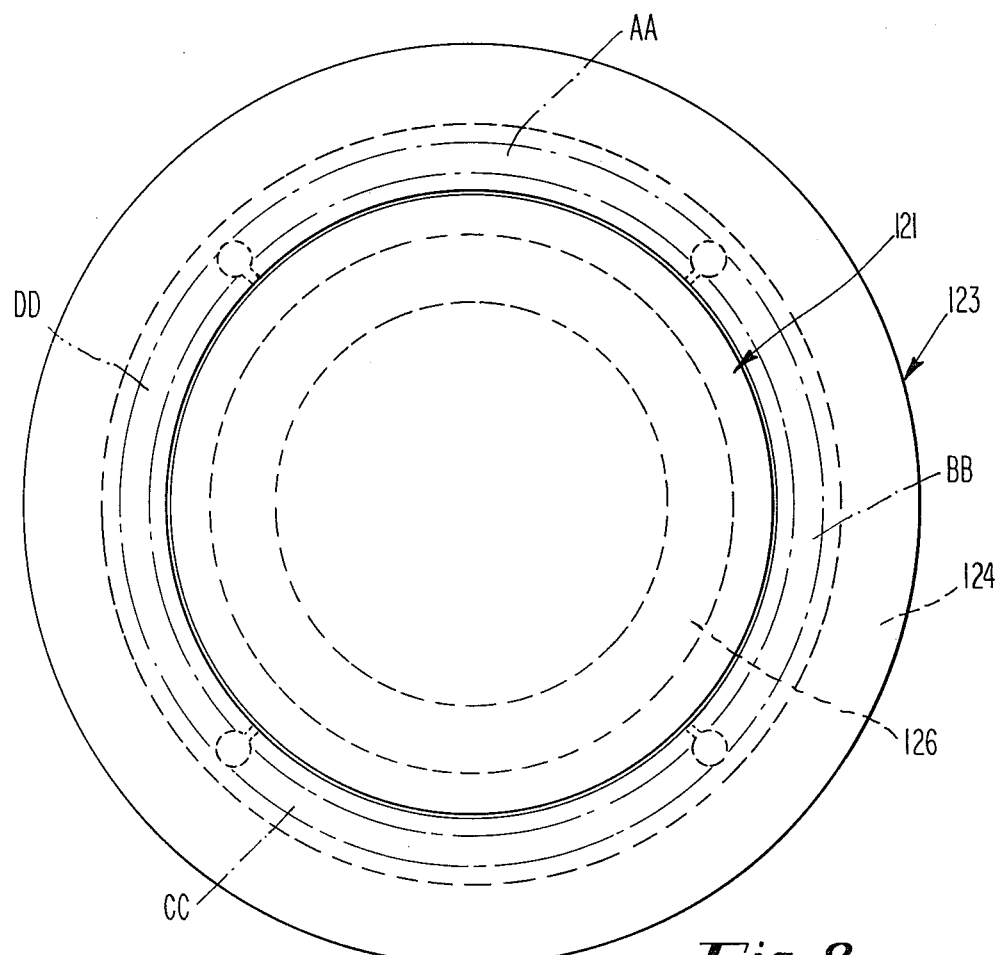
FIG. 8 is another version of the magnetic bearing system in which the rotor is surrounded by the stator.

A version of the magnetic bearing system in which the positions of the rotor and stator portions of the wafer unit have been reversed is shown in FIG. 8. In this view, the rotor 121 is surrounded by the stator 123. Included in the sandwich construction of the stator is an axially polarized annular permanent magnet 124, and preferably another permanent magnet in the form of a ring is provided within the rotor 121, this latter magnet 126 being axially polarized in the opposite sense to magnet 124. Either of these two permanent magnets can be used without the other.

As in the aforedescribed embodiments the spacing gap between the rotor and the stator is at a relatively large radius, shown as being appreciably greater than half the maximum radius of the outer portion of the wafer.

In the case, the segmental windings AA, CC and the further segmental windings BB, DD, indicated in FIG. 8 in dot-dash lines, are again included in the stator portion of the wafer assembly, to augment or diminish the magnetic flux in a given sector of the wafer in the portion of each stator pole piece next adjacent to the magnetic flux gap between stator and rotor.

The structure of FIG. 8 admits of the convenient supporting of a central shaft by the rotor portion, at the expense of foregoing having the control winding and gap ideally located as shown in FIGS. 1 and 2 for providing the rotating mass at the maximum radius of the system.

In the illustrated embodiments the pole face members have been illustrated as being completely flat. It will be appreciated that greater thickness (i.e. greater axial extent) of the permanent magnet in the stator and/or the rotor, relative to a given configuration of the confronting inner (stator) and outer (rotor) pole rings (as in FIGS. 1 and 2) may be provided by departing from the illustrated parallel planar configurations, egg. by relying on dishing of the pole pieces or on wide-angle conical configurations.

It will further be appreciated that where two wafer units are to be juxtaposed side by side, they preferably should have oppositely directed axial polarizations, for example, by giving the stator of the first such unit a north pole at its left side and the stator of the second unit a south pole at its left side, adjacent the south pole of the stator of the first wafer unit. The opposite polarization in each of the respective rotors is retained.

A further possible modification in the use of juxtaposed multiple wafers is the use of one or more common pole pieces for successive wafers in a laminated configuration. Such an arrangement would however forgo one advantage of independently made wafers, of uniform two-polar design, requiring only that alternate wafers be inverted after manufacture to bring like poles of any two successive stators adjacent each other.

In some instances the segmental windings included in the stator portion of the wafer assembly to augment or diminish the magnetic flux can be other than quadrantal coils. Sectoral windings of 3 up to 12 can be used, e.g. three 120° sector windings; five 72° sector windings; six 60° sector windings; eight 45° sector windings; nine 40° sector windings; ten 36° sector windings; or twelve 30° sector windings.

Other embodiments and applications of this invention will be obvious to those skilled in the art. However, it is to be specifically understood that all such applications and embodiments are contemplated as coming within the scope of the present invention.

What is claimed is:

1. Magnetic suspension apparatus comprising a wafer-like stator portion surrounded by a rotor portion,
    said stator portion comprising:
    two permeable discs and a permanent magnet therebetween,
    said permanent magnet having a diameter substantially greater than its thickness and being polarized axially whereby one face is its north pole and the opposite face is its south pole,
    said stator portion further including a plurality of sectoral windings in the peripheral regions of each of said permeable discs for inducing magnetic flux in respective sectors of each disc directed radially inwardly or radially outwardly accordingly as electric current is caused to flow in one direction or the opposite direction in a set of sectoral windings;
    said rotor portion comprising:
    means defining two inwardly-directed narrow annular pole faces spaced from each other in accordance with the spacing between the two permeable discs of the stator,
    said pole faces being of greater radius than the radius of the permeable discs of the stator whereby they provide the necessary magnetic gap,
    said annular pole faces being included in a magnetic flux path in the rotor which is directed outwardly from one annular pole face, thence axially, and thence inwardly to the other annular pole face.

2. Magnetic suspension apparatus as defined in claim 1, further including
    transducer means for sensing displacement of the rotor portion from concentricity with the stator portion in a direction to reduce the magnetic flux gap to one sectoral portion of the stator and increase the gap to the opposite sectoral portion, and
    means responsive to said transducer means and including amplifying and integrating means for selectively energizing the sectoral windings of the stator to oppose and overcome the displacement from concentricity as sensed and to impart an opposite displacement from concentricity to obviate continued energization of any set of windings.

3. Magnetic suspension apparatus as defined in claim 1, wherein said rotor portion comprises an annular permanent magnet to the opposite faces of which are fixed two thin rings of permeable material, each extending to a smaller radius than the inside radius of the annular permanent magnet, said annular permanent magnet being polarized to impart polarization between said thin rings of permeable material in the direction parallel to the axis and opposite to the polarization between the permeable discs of the stator.

4. Magnetic suspension apparatus as defined in claim 3, further including
    transducer means for sensing displacement of the rotor portion from concentricity with the stator portion in a direction to reduce the magnetic flux gap to one sectoral portion of the stator and increase the gap to the opposite sectoral portion, and
    means responsive to said transducer means and including amplifying and integrating means for selectively energizing the sectoral windings of the stator to oppose and overcome the displacement from concentricity as sensed and to impart an opposite displacement from concentricity to obviate continued energization of any set of windings.

5. Magnetic suspension apparatus as defined in claim 4 wherein the diameter of said stator portion is more than one-half as great as the diameter of said rotor portion.

6. Magnetic suspension apparatus as defined in claim 1 wherein the diameter of said stator portion is more than one-half as great as the diameter of said rotor portion.

7. Magnetic suspension apparatus comprising plural water-like stator portions each surrounded by a respective rotor portion, each wafer-like stator portion and its respective rotor portion being as defined in claim 1, the plural stator portions being fixedly positioned relative to each other and the plural rotor portions being interconnected into a common rotor.

8. Magnetic suspension apparatus comprising plural wafer-like stator portions each surrounded by a respective rotor portion, each wafer-like stator portion and its respective rotor portion being as defined in claim 4, the plural stator portions being fixedly positioned relative to each other and the plural rotor portions being interconnected into a common rotor.

9. Magnetic suspension apparatus comprising a stator portion and a rotor portion, one of said portions surrounding the other,
    each of said portions comprising two thin circular permeable pole pieces spaced apart by a distance of a lesser order of magnitude than its diameter,
    the radius of the inner portion being slightly less than the inner radius of the surrounding portion whereby a pair of substantially radial magnetic gaps are formed between the circular pole pieces of the inner portion and the respective pole pieces of the outer portion,
    a circular polarized permanent magnet between the two pole pieces of at least one of said two portions,
    and means including sectoral coils on one of said two portions for electromagnetic induction in the pole pieces immediately adjacent the magnetic flux for changing the strength of the magnetic flux induced across the gaps in any segmental region thereof by said permanent magnet.

10. Magnetic suspension apparatus as defined in claim 9, further including
    transducer means for sensing displacement of the rotor portion from concentricity with the stator portion in a direction to reduce the magnetic flux gap to one sectoral portion of the stator and increase the gap to the opposite sectoral portion, and
    means responsive to said transducer means and including amplifying and integrating means for selectively energizing the sectoral windings of the stator to oppose and overcome the displacement from concentricity as sensed and to impart an opposite displacement from concentricity to obviate continued energization of any set of windings.

11. Magnetic suspension apparatus as defined in claim 10, wherein said rotor portion comprises an annular permanent magnet of the opposite faces of which are fixed two thin rings of permeable material, each extending to a smaller radius than the inside radius of the annular permanent magnet, said annular permanent magnet being polarized to impart polarization between said thin rings of permeable material in the direction parallel to the axis and opposite to the polarization between the permeable discs of the stator.

12. Magnetic suspension apparatus as defined in claim 11, further including
 transducer means for sensing displacement of the rotor portion from concentricity with the stator portion in a direction to reduce the magnetic flux gap to one sectoral portion of the stator and increase the gap to the opposite sectoral portion, and
 means responsive to said transducer means and including amplifying and integrating means for selectively energizing the sectoral windings of the stator to oppose and overcome the displacement from concentricity as sensed and to impart an opposite displacement from concentricity to obviate continued energization of any set of windings.

* * * * *

UNITED STATES PATENT OFFICE
CERTIFICATE OF CORRECTION

Patent No. 4,043,614   Dated August 23, 1977

Inventor(s) Frank Lyman

It is certified that error appears in the above-identified patent and that said Letters Patent are hereby corrected as shown below:

Column 1, line 18 "manufacturing" should read "manufacture."

Column 1, line 47 "water-like" should read "wafer-like".

Column 3, line 11 "indicated" should read "induced".

Column 4, line 27 "Fig. 4" should read "Fig. 5".

Column 5, line 55 "durng" should read "during".

Column 8, line 32 "the" should read "this".

Column 8, line 52 "egg." should read "e.g.".

Column 8, line 59 after "second" insert "such".

Column 10, line 23 "water-like" should read "wafer-like".

Signed and Sealed this

Twenty-ninth Day of November 1977

[SEAL]

Attest:

RUTH C. MASON  
Attesting Officer

LUTRELLE F. PARKER  
Acting Commissioner of Patents and Trademarks